United States Patent Office 3,283,555
Patented Nov. 8, 1966

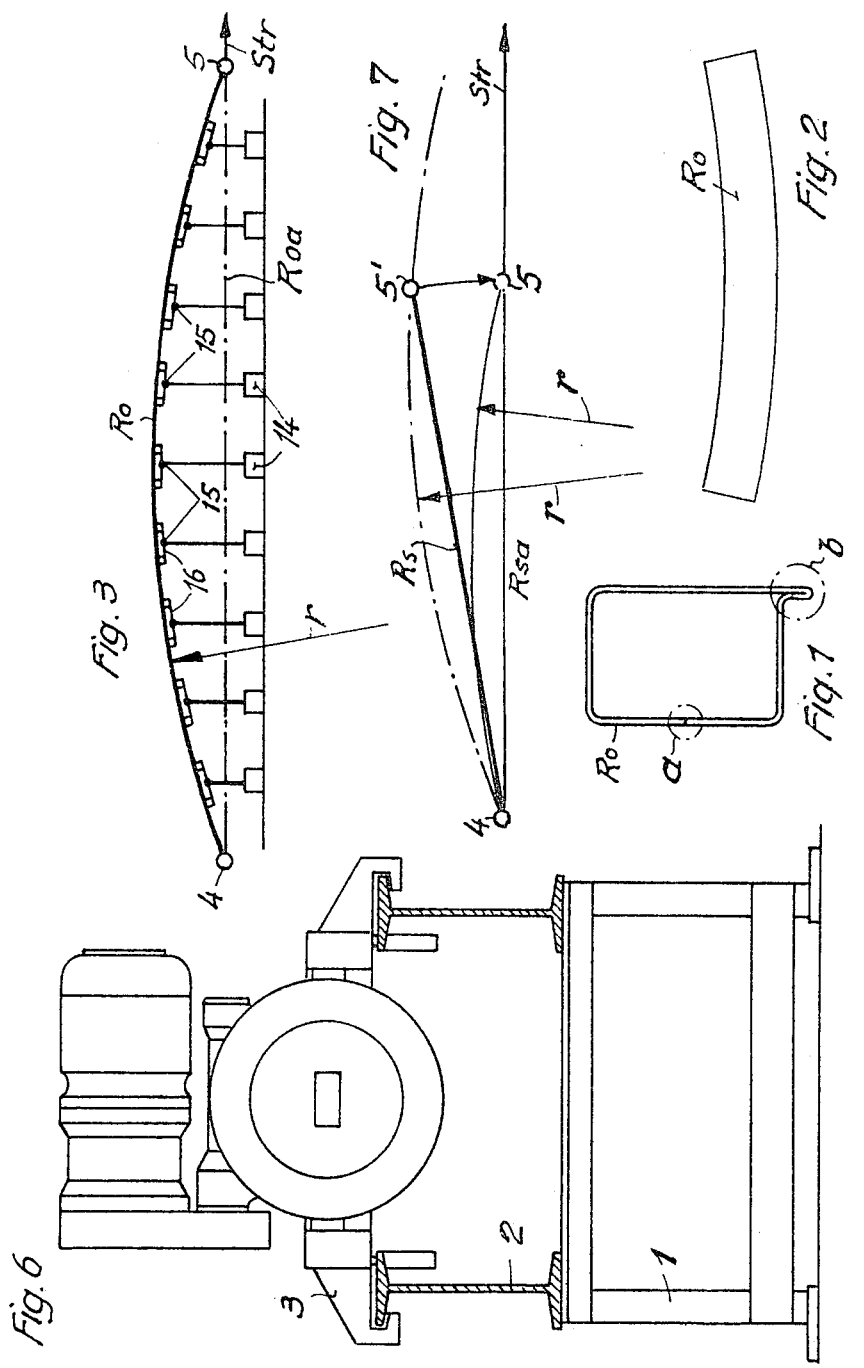

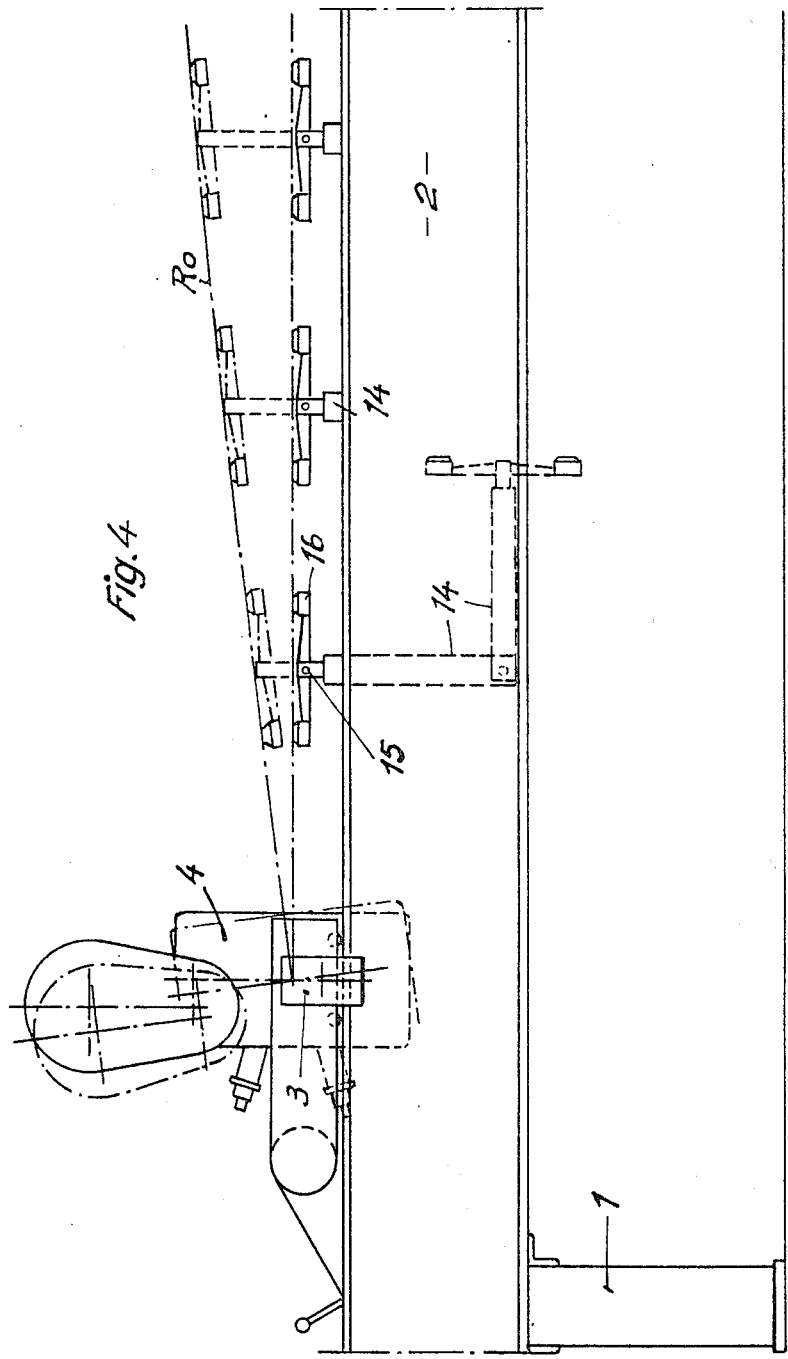

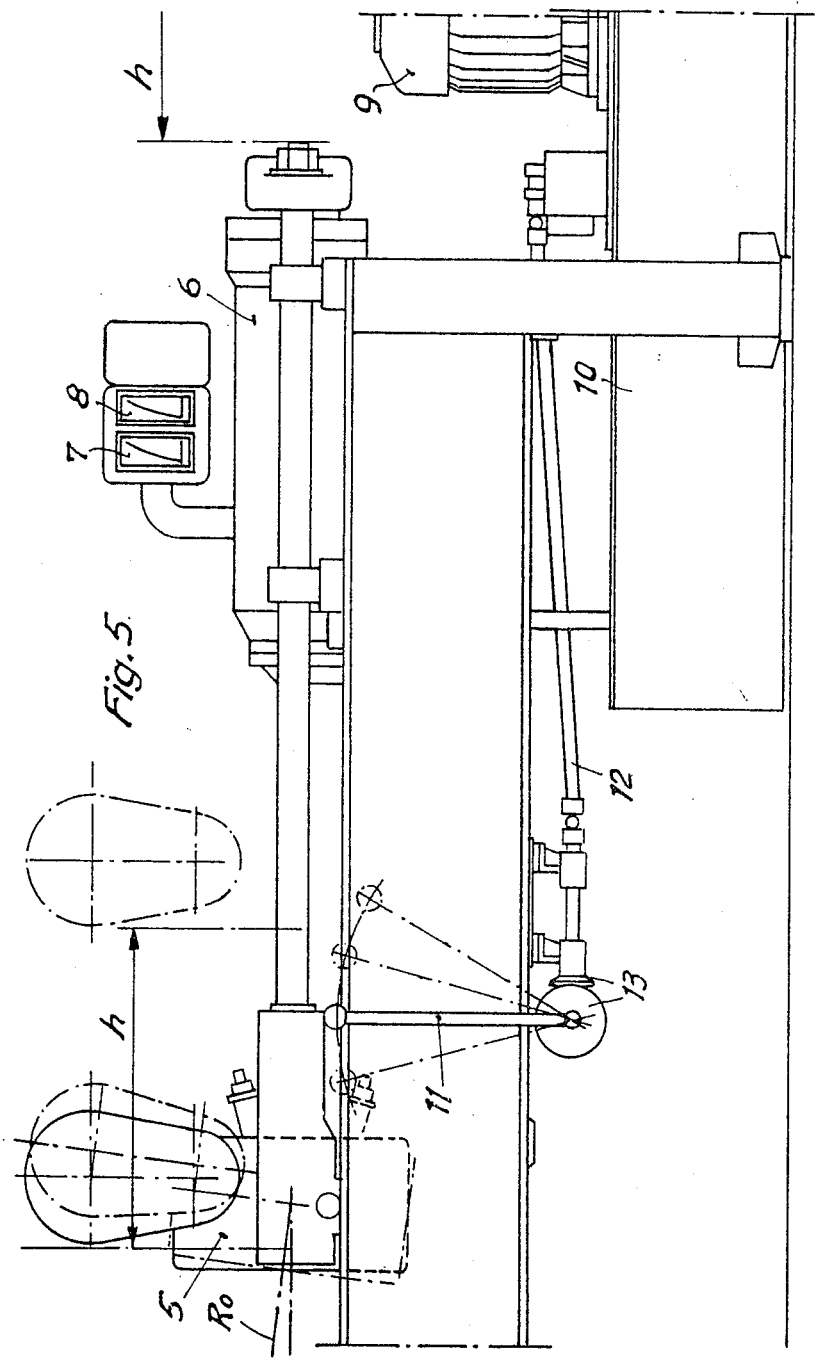

3,283,555
STRETCHING MACHINES FOR STRETCHING AND STRAIGHTENING MATERIAL
Paul Truninger, Langendorfstrasse 19, Solothurn, Switzerland
Filed Mar. 26, 1964, Ser. No. 354,881
4 Claims. (Cl. 72—297)

This invention relates to a stretching machine for stretching and straightening material, more particularly hollow steel section members, the machine having vices for gripping the two ends of the material being treated, one vice being adapted to be moved towards and away from the other vice by means of a carriage.

It has been found that welded steel tubes, more particularly those having asymmetrical cross-sections, very often cannot be stretched straight on the known stretching machines. Instead, cold-stretched tubes tend, immediately after they are removed from the stretching machine, to assume a slight arc of constant radius over their whole length and, therefore, have to be straightened after the stretching operation. This extra straightening is usually a highly time-consuming step which increases manufacturing costs.

Detailed experiments have shown that the reason for this distortion is that the elastic limit, which must of course be exceeded in the stretching operation, is not constant over the cross-section of tubes of this kind, due to structural changes in the weld seam and in the transition zone and to differences in work hardening during manufacture, in dependence upon the cross-sectional shape.

It is an object of the invention to enable material such as tubes or rods to be satisfactorily straightened by cold stretching, for which purpose, props are provided at short intervals between the vices and along the material being treated which can be raised by a common control element from a normal horizontal position into operative positions for forming uniformly curved paths along which the material is stretched.

For a better understanding of the invention and to show how the same may be carried into effect, reference may now be made to the accompanying drawings wherein:

FIG. 1 is a view in cross-section of a known tubular section member;

FIG. 2 is a view in side elevation, but to a reduced scale, of the tube shown in FIG. 1 after the same has been cold-stretched by a conventional method;

FIG. 3 diagrammatically illustrates the underlying idea on which the stretching machine according to the invention is based;

FIGS. 4 and 5 are each a side elevation showing, respectively that part of the stretching machine which comprises the stationary vice and that part of the stretching machine which comprises the carriage-mounted vice;

FIG. 6 is an end view of the machine shown in FIG. 5 with some parts omitted, and FIG. 7 diagrammatically ilustrates a detail to show the principle of operation.

FIG. 1 is a view in cross-section of a known tube $Ro$ which is asymmetrical and which after cold-stretching has substantially the curved shape shown to a reduced scale in FIG. 2. Detailed experiments have shown that hollow section members or rods can be cold-stretched satisfactorily provided that stretching allows for the fact that there are differences in yield at points along any section member. Accordingly, the material is stretched not along a straight path but along a curved path, to provide a compensation between points of different yield so that the differences therebetween cannot cause any curvature of the finished article.

FIGS. 4–6 show an exemplary embodiment of a stretching machine for cold stretching and straightening hollow section members. The machine has a base 1 on which two parallel longitudinal supports 2 forming the machine bed are placed at a distance from one another. A first vice 4 is disposed at one end of the bed 2 on a carrier 3. Vice 4 is pivoted in the longitudinal center plane of the bed 2 and is rotatable about its axis. At the other end of the bed 2 is an identical but carriage-mounted second vice 5 (see FIG. 5), which can move lengthwise and which is connected to the piston of a hydraulic cylinder 6. Two pressure gauges 7, 8 each indicating different pressure ranges are connected to the cylinder 6 to indicate the pressure therein. A hydraulic pump 9 serves to supply a pressure liquid to the cylinder 6 and is connected to an expansion vessel 10. Also disposed on the bed 2 is a pivoting control lever 11 which can be operated via linkage 12 and gearing 13.

Cylinders 14 are disposed at short intervals inside the bed 2 and along the longitudinal center plane thereof and are connected to the pump 9 in some manner which is not shown. When in operation, the cylinders 14 are in a vertical position; but they can be disconnected individually from the pump line and pivoted around a horizontal axis into a different position; this latter position is shown in FIG. 4 for one of the cylinders. Movable in each cylinder 14 is a piston having a piston rod 15 whose outwardly projecting end carries a pivoting double-armed thrust member 16 adapted to bear the material being treated.

It has been found that stretching hollow section members or bars over a shape representing an arc provides the required effect. This arcuate shape is provided by the members 16 which, through the agency of the pump 9, can be raised from their normal positions, shown in solid line in FIG. 4, into operative positions shown in chain-dotted lines; in the operative position the members 16 from parts of a catenary corresponding substantially to an arc, as shown in FIG. 3, the two clamping stations or vices for the material also being disposed on the same arc. Accordingly, the cylinders 14 are so devised that, for a constant hydraulic pressure produced by the pump, the piston rods 15 are raised appropriate distances from their normal positions. This is achieved by known means enabling the distances travelled by the pistons in the various cylinders so to differ from one another that the members 16 form an arc.

The hollow section member which is required to be stretched and which is symbolically shown in FIG. 3 by a chain-dotted line $Roa$ is placed on the lowered members 16 and clamped in the vices 4, 5; the members 16 are then raised, to form the arc, into the operative position in which the hollow section member assumes the curved shape $Ro$ represented by a solid line in FIG. 3, whereafter the section member is stretched by the vice 5 being moved in the direction indicated by an arrow $Str$. When the hollow section member is released by the vices 4 and 5 upon the completion of stretching—i.e., after the vice 5 has travelled the distance $h$ in FIG. 5—the hollow section member is straight i.e., uncurved—and therefore requires no further straightening after the stretching step.

Since the difference in the yield at the various points of the material to be stretched are unknown to start with, the first requirement is to ascertain that arc radius $r$ for any particular hollow section member to which the members 16 must be adjusted. To this end, one of a batch of identical tubes is first stretched along a straight line, whereafter the deviation of the stretched tube from the straight line is found. The plane of the curvature is also determined. Of course, the curvature of the path over which the article is stretched has the same radius and lies in the same plane in the opposite direction. To this end, the two vices 4 and 5 are formed as rotatable heads which can be rotated synchronously from a single station by known means to bring the material to be stretched into the correct plane.

In practice it is required to stretch hollow section members of different lengths, for instance, of lengths varying from 3 to 8 metres; with 8 metre long hollow section members, the apex of the arc may lie some 10–15 cm. above the straight line interconnecting the vices 4 and 5. To allow for this on the machine according to the invention, the vice 5 is movable along the bed 2 so that relatively short material can be clamped in the vices. Assuming that the arc radius $r$ is to be unchanged, then as FIG. 7 shows, the chord $Rs$ corresponding to the short length of material is determined as being the distance 4–5′, whereafter the position to which the vice 5 must be moved to clamp its end of the hollow section member is found by the corresponding length $Rsa$ being laid off along the straight line interconnecting the two vices. In this case, the wanted arc of unchanged radius $r$ passes through the vices 4, 5 in the manner visible in FIG. 7. Since, as already stated, those cylinders 14 which are not required in any particular case can be disconnected from the pump line and placed in a position allowing unhindered operation, only those cylinders 14 which are disposed along the length $Rsa$ operate before the stretching operation, the corresponding members 16 moving out as required to form the appropriate arc.

The stretching machine hereinbefore described is a hydraulic machine, but the principle is also of use with pneumatic or mechanical stretching machines, although these latter constructions are very rare.

An arcuate stretching support which can be adjusted to any required radius can be provided mechanically as well as hydraulically, for instance, with the use of screw threaded spindles driven from a horizontal shaft. To ensure that the members 16 provide the arcuate shape, all the spindles can have the same screw thread pitch but the transmission ratios of individual spindles can be varied appropriately from one another; alternatively, a single transmisison ratio can be used for all the spindles while their screw threads have different pitches from one another. To enable a machine thus embodied to be adapted to different lengths of material, the best thing is for the props to be placed on a longitudinal support which extends over the whole stretching length, is rotatable in the vertical plane around the point 4 in FIG. 7 and is so adjusted that the chord 4–5′ corresponding to whatever happens to be the stretching length is brought into the horizontal plane.

I claim:
1. A stretching machine for stretching and straightening material, more particularly hollow steel section members, said machine comprising:
 (a) vices for gripping the two ends of the material to be treated;
 (b) a carriage mounting one of said vices for movement thereof towards and away from the other of said vices;
 (c) props provided at short intervals between said vices; and
 (d) a common control element for raising the props into respective operative positions to constrain the material into arcuate form while it is being stretched by said vices and thus to prevent lateral distortion in the straightened material due to the physical properties of the material.
2. A stretching machine for stretching and straightening material, more particularly hollow steel section members, said machine comprising:
 (a) vices for gripping the two ends of the material to be treated;
 (b) a carriage mounting one of said vices for movement thereof towards and away from the other of said vices;
 (c) props provided at short intervals between said vices, said props each including:
  (i) a cylinder,
  (ii) a piston movable in said cylinder in response to hydraulic pressure therein,
  (iii) a piston rod connected to said piston, and
  (iv) a portion for contacting the material and articulated to said piston rod; and
 (d) a source of hydraulic pressure to supply hydraulic fluid to said cylinders for raising said portions into respective operative positions to constrain the material into arcuate form while it is being stretched by said vices and thus to prevent lateral distortion in the straightened material due to the physical properties of the material.
3. A stretching machine for stretching and straightening material, more particularly hollow steel section members, said machine comprising:
 (a) vices for gripping the two ends of the material to be treated;
 (b) a carriage mounting one of said vices for movement thereof towards and away from the other of said vices;
 (c) props provided at short intervals between said vices, said props including screwthreaded spindles having the same pitch; and
 (d) a common driving shaft for said spindles and having different transmission ratios therewith differentially to raise said props into respective operative positions to constrain the material into arcuate form while it is being stretched by said vices and thus to prevent lateral distortion in the straightened material due to the physical properties of the material.
4. A stretching machine for stretching and straightening material, more particularly hollow steel section members, said machine comprising:
 (a) vices for gripping the two ends of the material to be treated;
 (b) a carriage mounting one of said vices for movement thereof towards and away from the other of said vices;
 (c) props provided at short intervals between said vices, said props including screwthreaded spindles; and
 (d) a common driving shaft for said spindles and having the same transmission ratios therewith, said spindles having different pitches differentially to raise said props into respective operative positions to constrain the material into arcuate form while it is being stretched by said vices and thus to prevent lateral distortion in the straightened material due to the physical properties of the material.

References Cited by the Examiner
UNITED STATES PATENTS

| | | | |
|---|---|---|---|
| 931,325 | 8/1909 | MacDonald | 72—296 |
| 1,441,354 | 1/1923 | Jones | 72—701 |
| 2,431,173 | 11/1947 | Hawkes | 72—297 |
| 2,850,071 | 9/1958 | Kraybill | 72—297 |

CHARLES W. LANHAM, *Primary Examiner.*

L. A. LARSON, *Assistant Examiner.*